Patented Mar. 19, 1940

2,194,200

UNITED STATES PATENT OFFICE 2,194,200

ELECTRICAL WELDING FLUX AND METHOD

Willi M. Cohn, Berkeley, Calif., assignor to Western Pipe & Steel Company of California, San Francisco, Calif., a corporation of California No Drawing. Application December 13, 1938, Serial No. 245,427

10 Claims. (Cl. 219—10)

This invention relates generally to flux compositions for use in electrical welding operations, and to the manufacture of such fluxes. The invention also relates to electrical welding methods and operations making use of an electric arc, particularly where weld metal is deposited from a rod or wire.

In electrical arc welding it is conventional practice to use various flux compositions which are supplied to the welding zone in varying amounts to facilitate a proper bond between the weld metal and the work. In this connection it is common to use various types of clays and mixtures of various compounds including clay, soda ash, borax, lime, asbestos, etc. In other instances, various compounds have been fused to form a glass type flux.

Fluxes formed of natural clays, or containing mixtures of chemical compounds, are subject to certain disadvantages including lack of uniformity with respect to melting temperature. Such lack of uniformity may seriously impair the soundness of the weld produced, particularly when the welding is being carried out below a relatively deep bed of flux.

Fluxes of the pre-fused or glass type are expensive to manufacture, both because of the cost of raw materials employed, and because of the cost of the fusing operation. Such fluxes have also afforded a melting point at or below the melting point of steel, and thus when used in conjunction with electrical welding operations making use of a welding rod or wire from which the metal is deposited, they tend to form a molten pool of the flux material adjacent the welding zone. Such fluxes are also somewhat critical with respect to adjustment of currents, voltage, and other factors, and are not readily adaptable to both heavy and light plate welding operations, without a change in composition.

For welding operations making use of a deep bed of flux the melting point of the composition or mixture has been such that the flux becomes molten at a temperature comparable to or below the melting point of steel, and this property has been deemed necessary for proper operation. Furthermore although such prior art fluxes have contained minor amounts of alumina, use of this ingredient in larger amounts has been deemed detrimental. As will be presently explained, my flux composition is contrary to the teachings of the prior art in both of the above respects. It has a melting point far above the melting point of steel, and alumina is one of its major ingredients.

In fact it can be properly termed an aluminous flux.

In view of the foregoing it can be stated as an object of the present invention to provide a new flux composition for electrical welding, which will have advantages not possessed by prior fluxes, and which can be manufactured at relatively low cost.

Another object of the invention is to provide a flux composition which when used as a relatively deep bed for arc welding operations, will make possible a new and novel method of welding, characterized by formation of a viscous envelope substantially entirely surrounding the welding zone.

A further object of the invention is to provide a novel method for manufacturing a flux composition in accordance with the present invention.

The flux composition of the present invention consists of a high percentage of alumina together with other compounds in the form of an anhydrous synthetically crystallized material. To form such a material a suitable mixture of raw ingredients is subjected to a processing operation, in which the mixture is heated slowly to a predetermined temperature, maintained at such a temperature over a substantial period of time in order to change the initial crystal formation, and then permitted to cool slowly to preserve the new crystals formed. As will be presently explained the composition of the material should be maintained within certain general limits. I prefer to mix the aluminous material resulting from the processing operation with certain modifying agents, particularly one or several fluoride salts such as sodium, calcium, potassium, or lithium fluoride.

One practical method of manufacturing my flux is as follows: Suitable raw materials are thoroughly ground and intermixed to afford proportions capable of giving the final analysis desired. For example a suitable natural clay can be selected containing a higher percentage of alumina than desired in the final product, and to this clay is added a sufficient quantity of another clay which is low in alumina. The final mixture can contain for example 46% alumina, with the remainder being mainly silica and impurities such as are found in natural clays. By impurities I have reference to a range such as from 1 to 10% of the total mixture. Impurities commonly present in such raw materials generally afford compounds such as titanium dioxide, iron oxide, boric oxide, sodium oxide, potassium oxide, calcium oxide and magnesium oxide.

For convenience the raw mixture can be left as a powder, or made into slabs, or molded to convenient forms, to facilitate further processing. Such a homogeneous mixture is then heated under controlled temperature and atmospheric conditions. The temperature of the mixture is increased gradually over a substantial period of time, as for example about 10 hours, until a suitable processing temperature below the melting point of the ingredients or their compounds, is attained, such as a temperature of about 2200° F. This temperature is then carefully maintained over a period of time as for example about 3 hours, after which the temperature of the material is slowly lowered to preserve the new crystals formed.

In actually observing the heating curve while the temperature is being gradually increased, definite endothermic and exothermic reactions are indicated. Thus as the temperature is gradually increased the original crystals are broken down and new crystals formed. Irrespective of the equipment and precise procedure employed in the processing operation, the factors of time and temperature should be such as to eliminate all physically and chemically bound water, and to enable reaction between alumina and other compounds such as silica to form crystals high in alumina, constituting an aluminous flux which is of definite crystalline composition.

Such a processing operation as described above is distinctly different from a melting operation, used in forming glass fluxes, because in the latter all ingredients are molten. The melt is then cooled and remains amorphous. No reaction takes place in making glass fluxes, to form a crystalline material. The heating curve of a glass flux does not show endothermic or exothermic reactions prior to melting. The crystals present in the raw mixtures for a glass flux are broken down by melting and no new crystals are formed in the final composition.

After the processing operation described above the aluminous material can be readily ground to form a powder of suitable fineness. To this powder I then prefer to add small amounts of a suitable modifying agent. Particularly I prefer to add a fluoride like sodium fluoride. Other agents like small amounts of titanium dioxide or boric oxide can be introduced into the composition, provided they are completely anhydrous.

The aluminous flux composition produced as described above is an anhydrous powder. It possesses a characteristic type of crystalline structure, such as will be presently explained in detail, and can be properly termed a synthetic crystallized product.

Reference has been made to the relatively large amount of alumina in the flux composition. Ignoring other ingredients in the composition good results can be obtained by maintaining the alumina content between the general limits of about 42 to 60%. The preferred range specified includes a eutectic point in the equilibrium diagram of the system alumina-silica, equivalent to about 56% alumina.

As previously explained the use of modifying agents is desirable, and I have secured best results by use of such modifying agents added to the aluminous flux material, after the processing operation. The fluxes which have been deemed to give best results contain from about 5 to 10% of modifying ingredients like titanium dioxide, together with from 3 to 7% of sodium fluoride. Rutile can be used as the source of titanium dioxide, and it can be added after the processing operation without pre-treatment. Natural feldspar has also been used with good results as a modifying agent.

The following are approximate analyses of 5 typical aluminous fluxes made in accordance with the method described herein, and which have been found to give good results.

| Sample No. | 1 | 2 | 3 | 4 | 5 |
|---|---|---|---|---|---|
| | Percent | Percent | Percent | Percent | Percent |
| $Al_2O_3$ | 58.6 | 57.8 | 57.6 | 44.1 | 45.7 |
| $SiO_2$ | 39.8 | 39.9 | 41.8 | 51.5 | 52.9 |
| $TiO_2$ | | .5 | .6 | 1.6 | .9 |
| $Fe_2O_3$ | | 1.8 | | 2.0 | |
| $CaO$ | .6 | | | | .5 |
| Alkalies | 1.0 | | | .8 | |

To each of the above five materials I add about 7% of modifying agents, as for example 7% of sodium fluoride, or 3% of sodium fluoride plus 4% of rutile, or 3% of sodium fluoride plus 4% of feldspar.

While my composition can be used in various ways in conjunction with electrical welding operations, I prefer to use a deep bed to blanket over the welding arc and welding zone. Thus as applied in automatic electrical arc welding to join together the abutting edges of two notched steel plates, the notch between the plates is filled with the powdered flux composition, and an additional amount of flux is added to afford a blanketing layer overlying the work. The welding rod or wire employed is then projected down through the layer of flux, and an arc established to the work. As is known by those familiar with automatic electrical welding operations the electrode is advanced along the seam to be welded, while the welding wire or rod is fed automatically towards the work. By way of example, with bare $\frac{5}{16}$ inch welding rod moving at a rate of 11 inches per minute, 1275 amperes at 41 volts can be used to weld ¾ inch steel plate in one pass.

The precise crystalline nature of the aluminous flux produced as previously described, has been made the subject of careful investigation. This analysis of the crystal formation was made by X-ray diffraction in accordance with the Debye-Scherrer-Hull method. The X-ray diffraction patterns obtained were compared with patterns obtained from natural clays, such as used in various prior art fluxes, and with fluxes of the fused or glass type. This analysis shows that my aluminous flux possesses two distinct crystal forms, both of which differ from the crystalline nature of natural flux forming minerals and clays, and from the amorphous non-crystalline nature of glass type fluxes. One crystal form I identify as being a combination between the alumina present, and the major part of the silica. The other crystal form present I identify as being crystals of cristobalite (silica). In conjunction with this analysis I have also found that when the flux material is heated to an elevated temperature which may be less than its melting point, sodium fluoride (or other fluorides present) combines with the free silica present, and silicon tetrafluoride formed as a result of this reaction vaporizes. Thus before my flux composition is heated to a temperature corresponding to its melting point, as for example by means of the electrical arc, most of the free silica is eliminated from the composition, by reaction with the fluoride content, whereby the melting point is determined solely by the remaining material.

Sodium fluoride reacts as described above with free silica present, and either excess sodium fluoride or fluoride compounds formed appear to afford a smoother surface to the finished weld, with an optimum flow of weld metal.

It will be evident from the foregoing that when my flux is employed in automatic welding operations as described above, a new and novel method takes place due to the properties and characteristics of the composition. An electric arc is formed within the flux bed, and because of the intense heat of the arc and the high melting point of the flux, the flux surrounding the arc forms a viscous semi-liquid envelope substantially entirely surrounding the arc. There is visual evidence of the arc, and some burning of gases at the surface of the flux bed about the welding rod. The walls of the envelope remain substantially intact except for the removal of part of the envelope to overlie the deposited weld metal. Adjacent the outer surface of this envelope the flux composition is heated to a temperature sufficiently high to cause reaction between the sodium fluoride and uncombined crystallized silica, thereby removing this crystallized silica from the composition as described above, before any fusion occurs in the proximity of the arc. In other words for a zone of the flux surrounding the viscous envelope a reaction is taking place in which sodium fluoride combines with free crystallized silica, to form a compound which volatilizes, with the vapors escaping upwardly through the bed of flux material. Such vapor formation is deemed advantageous because its formation enables the removal of free silica to provide a uniform melting point for the remaining composition, and further because the vapor formation tends to stabilize the arc and exclude oxygen and nitrogen from the welding zone.

The formation of the viscous envelope is in part attributed to the high melting point of the flux material, which as previously stated is far above the melting point of the weld metal or the steel plate. Tests which I have conducted in an endeavor to determine the melting point of my composition definitely show that the material will not melt at a temperature of the order of 2600° F., and indicate that the melting point is probably in the neighborhood of about 3500° F. Further tests show that the flux tends to have considerable viscosity when used under the heat of the welding zone. This characteristic enables the envelope to remain intact with the walls relatively self sustaining.

A further characteristic of the flux is that it is of porous character and a relatively poor conductor of heat. Thus the flux material which is not directly exposed to the arc forms in effect a heat insulating blanket which extends in close proximity to the arc over a considerable length of freshly deposited weld metal. This blanket aids in retaining heat in the deposited weld metal and the adjacent metal of the work being welded and to secure a proper annealing action.

The method described above is different from the use of a deep bed of pre-fused glassy alkaline earth metal silicate. Tests have shown that alkaline earth silicates readily fuse to form a molten pool of relatively fluid flux adjacent the welding zone, since its melting point is below the melting point of steel. Any fluoride content, such as sodium fluoride, added to such a flux material can not serve in the manner previously described to remove free crystallized silica, because no free crystallized silica is present. Tests have shown that pre-fused alkaline earth metal silicates have a considerably higher heat conductivity than my flux material, and therefore heat from the deposited weld metal is more rapidly dissipated.

Welding carried out as described above results in a sound weld and can be universally applied to steel plates over a wide range of thicknesses, as for example plates from ⅛ to 1 inch or more. As previously pointed out the welding currents and voltages must be adjusted in accordance with the amount of weld metal being deposited, the speed of the weld, and in accordance with other conditions which may be present, but the flux is not critical with respect to such factors. Tests carried out upon actual welds produced by the use of my fluxing method, have demonstrated that a sound weld is formed having properties which are deemed desirable in welding operations. For example in typical instances the welds have shown an ultimate tension (in pounds per square inch) ranging from about 65,400 to about 72,000, a yield point ranging from 48,800 to 49,800, and an elongation in 2 inches ranging from 18 to 32%. In an all weld metal tension test the ultimate tension in pounds per square inch ranged from about 63,000 to 68,200, yield point from about 34,000 to about 42,000, elongation in 2 inches from about 26 to 28%, and reduction in area of from 49 to 51%. In the so-called "free bend" test, typical welds gave an elongation ranging from 45 to 70%, with no cracks showing. A "nick break" test showed complete penetration, with no holes or slag inclusions. X-ray tests showed that the welds were entirely satisfactory.

Reference has been made to the fact that my flux composition can be made at relatively low cost. This is because the raw materials entering into the manufacture of my flux can be secured at low cost, and the processing is a comparatively inexpensive operation, particularly as compared to the fusing and quenching of certain prior art fluxes. Furthermore after the processing operation the resulting aluminous flux can be ground with ease, as compared to the more difficult task of grinding glassy silicate fluxes.

This application is a continuation in part of my co-pending application Serial No. 174,964, filed November 17, 1937.

I claim:

1. As a product of manufacture, an aluminous flux for deep flux bed electrical arc welding, which comprises, a powdered material having a melting point substantially in excess of the melting point of steel and containing predominantly combined silica and alumina present as anhydrous crystalline material, the remainder being substantially anhydrous and including free anhydrous crystalline silica.

2. As a product of manufacture, an aluminous flux for deep flux bed electrical arc welding, which comprises, a powdered material having a melting point substantially in excess of the melting point of steel and containing predominantly combined silica and alumina present as anhydrous crystalline material, the remainder being substantially anhydrous and including free anhydrous crystalline silica, and a small amount of a material capable of combining with said free silica to form a volatile compound during said welding.

3. As a product of manufacture, an aluminous flux for deep flux bed electrical arc welding, which comprises, a powdered material having a melting point substantially in excess of the melting point of steel and being predominantly combined silica and alumina in the form of anhydrous crystalline material admixed with small amounts of an oxide of titanium and fluoride selected from the group consisting of alkali metal and alkaline earth metal fluorides.

4. As a product of manufacture, an aluminous flux for deep flux bed electrical arc welding, which comprises, a finely divided material containing between approximately 42 and 60% alumina, the remainder being principally silica, and a small amount of a fluoride selected from the group consisting of alkali metal and alkaline earth metal fluorides, said alumina being substantially all chemically combined with silica in the form of anhydrous crystalline material and a part of the silica being present in the form of cristobalite.

5. As a product of manufacture, an aluminous flux for deep flux bed electrical arc welding, which comprises, a powdered material containing between approximately 42 and 60% alumina, the remainder being principally silica, admixed with a small amount of titanium dioxide and sodium fluoride, said alumina being substantially all combined with silica in the form of anhydrous crystalline material and a part of the silica being present as free anhydrous crystalline silica.

6. The method of electrical welding, which comprises, the steps of establishing a welding arc between a work piece and a metallic electrode to deposit metal from said electrode upon said work piece, and blanketing the arc in the welding zone with an aluminous flux containing principally combined silica and alumina in anhydrous crystalline form and predominately combined silica and alumina having a melting point substantially in excess of the melting point of said metal to produce a viscous tenacious envelope surrounding the welding zone and provide a heat insulating covering for the deposit metal during cooling of the same after completion of the weld.

7. The method of electrical welding, which comprises, the steps of establishing a welding arc between a work piece and a metallic electrode to deposit metal from said electrode upon said work piece, and blanketing the arc in the welding zone with an aluminous flux having a melting point substantially in excess of the melting point of steel and containing predominantly combined silica and alumina in anhydrous crystalline form, the remainder being substantially anhydrous and containing free anhydrous crystalline silica, to produce a viscous, tenacious envelope surrounding the welding zone and to provide a heat insulating covering for the deposit metal during the cooling of the same after completion of the welding.

8. The method of electrical welding, which comprises, the steps of establishing a welding arc between a work piece and a metallic electrode to deposit metal from said electrode upon said work piece, and blanketing the arc in the welding zone with an anhydrous crystalline aluminous flux containing predominantly combined silica and alumina in anhydrous crystalline form, the remainder being free anhydrous crystalline silica and a small amount of a titanium oxide and a fluoride selected from the group consisting of alkali metal and alkaline earth metal fluorides, said flux having a melting point substantially in excess of the melting point of said metal so as to produce a viscous, tenacious envelope surrounding the welding zone and to provide a heat insulating covering for the deposit metal during cooling of the same after completion of the weld, said fluoride reacting with said free silica during welding to form a compound which volatilizes during said welding.

9. In the method of producing a welding flux for deep flux bed electrical welding, the steps which comprise, heating a mixture containing between approximately 42 and 60% alumina, the remainder being principally silica, to an elevated temperature below the fusing point of said mixture to change the crystalline structure of said mixture and produce an anhydrous crystalline material in which silica and substantially all of the alumina are combined in anhydrous crystal form and free anhydrous crystalline silica is present, and gradually cooling said anhydrous crystalline material to preserve the crystal structure thereof.

10. In the process of producing a welding flux for deep flux bed electrical welding, the steps which comprise, heating a crystalline mixture containing between approximately 42 and 60% alumina, the remainder being principally silica, to a temperature of approximately 2200° F. to change the crystal structure of said mixture and produce an anhydrous crystalline material in which silica and substantially all of the alumina are combined in anhydrous crystalline form and free anhydrous crystalline silica is present, and gradually cooling said anhydrous crystalline material to preserve the crystal structure thereof.

WILLI M. COHN.